(12) United States Patent
Roth et al.

(10) Patent No.: US 11,644,662 B2
(45) Date of Patent: May 9, 2023

(54) PRIVACY GLASS VISION PANEL

(71) Applicant: Privacy Glass Solutions, Coral Springs, FL (US)

(72) Inventors: Kevin Roth, Parkland, FL (US); Phil Rayford, Miramar, FL (US); Johan Mendoza, Tamarac, FL (US); Humberto Roza, Fort Lauderdale, FL (US)

(73) Assignee: Privacy Glass Solutions, Coral Springs, FL (US)

( * ) Notice: Subject to any disclaimer, the term of this patent is extended or adjusted under 35 U.S.C. 154(b) by 153 days.

(21) Appl. No.: 17/376,936

(22) Filed: Jul. 15, 2021

(65) Prior Publication Data
US 2023/0019899 A1  Jan. 19, 2023

(51) Int. Cl.
*E06B 9/24* (2006.01)
*G02B 26/02* (2006.01)

(52) U.S. Cl.
CPC .............. *G02B 26/023* (2013.01); *E06B 9/24* (2013.01); *E06B 2009/2417* (2013.01)

(58) Field of Classification Search
CPC ................ B60J 3/04; E06B 2009/2464; E06B 2009/2417; E06B 9/24; G02B 26/023
See application file for complete search history.

(56) References Cited

U.S. PATENT DOCUMENTS

| | | | |
|---|---|---|---|
| 9,345,357 B1* | 5/2016 | Davila, Jr. | E06B 7/28 |
| 2012/0080080 A1* | 4/2012 | Shalit | G02B 5/223 |
| | | | 359/639 |
| 2017/0130461 A1* | 5/2017 | Ebeling | E06B 9/24 |

* cited by examiner

*Primary Examiner* — Mariam Qureshi
(74) *Attorney, Agent, or Firm* — Harness, Dickey & Pierce, P.L.C.

(57) ABSTRACT

A privacy glass vision panel assembly includes a fixed first transparent panel having a plurality of spaced vertical non-transparent lines disposed between spaced vertical transparent lines. A movable second transparent panel is disposed next to the fixed first transparent panel and includes a plurality of spaced vertical non-transparent lines disposed between spaced vertical transparent lines. A bearing system supports the movable second transparent panel relative to the fixed first transparent panel. A first magnet unit is secured to the movable second vision panel and a second magnet unit is secured to and movable relative to the fixed first transparent panel in proximity to the first magnet unit to cause movement of the movable second transparent panel when the second magnet unit is moved relative to the fixed first transparent panel.

15 Claims, 6 Drawing Sheets

PRIVACY GLASS VISION PANEL

FIELD

The present disclosure relates to a privacy glass vision panel.

BACKGROUND

This section provides background information related to the present disclosure which is not necessarily prior art.

Privacy glass vision panels are used in doors and walls in which it is designed to provide an open view and to provide the option of allowing privacy on demand to provide maintenance free and customizable observation control windows. Privacy glass vision panels are known for use in medical facilities, business environments, educational facilities and numerous other environments for providing privacy and security when needed.

SUMMARY

This section provides a general summary of the disclosure, and is not a comprehensive disclosure of its full scope or all of its features.

A privacy glass vision panel assembly includes a fixed first transparent panel having a plurality of spaced vertical non-transparent lines disposed between spaced vertical transparent lines. A movable second transparent panel is disposed next to the fixed first transparent panel and includes a plurality of spaced vertical non-transparent lines disposed between spaced vertical transparent lines. A bearing system supports the movable second transparent panel relative to the fixed first transparent panel. A first magnet unit is secured to the movable second vision panel and a second magnet unit is secured to and movable relative to the fixed first transparent panel in proximity to the first magnet unit to cause movement of the movable second transparent panel when the second magnet unit is moved relative to the fixed first transparent panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
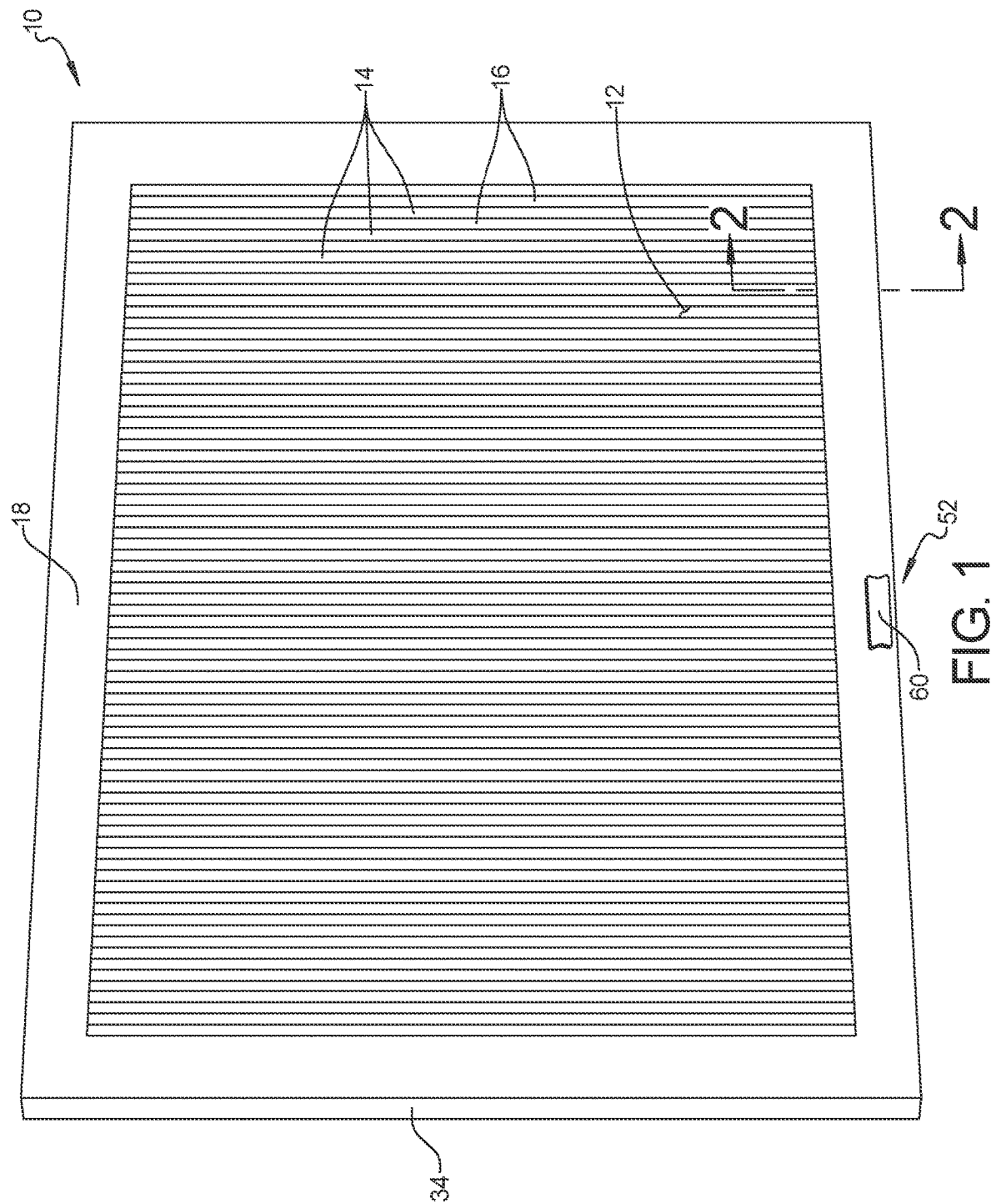
FIG. 1 is a perspective view of a privacy glass vision panel assembly according to the principles of the present disclosure.
Figure 2:
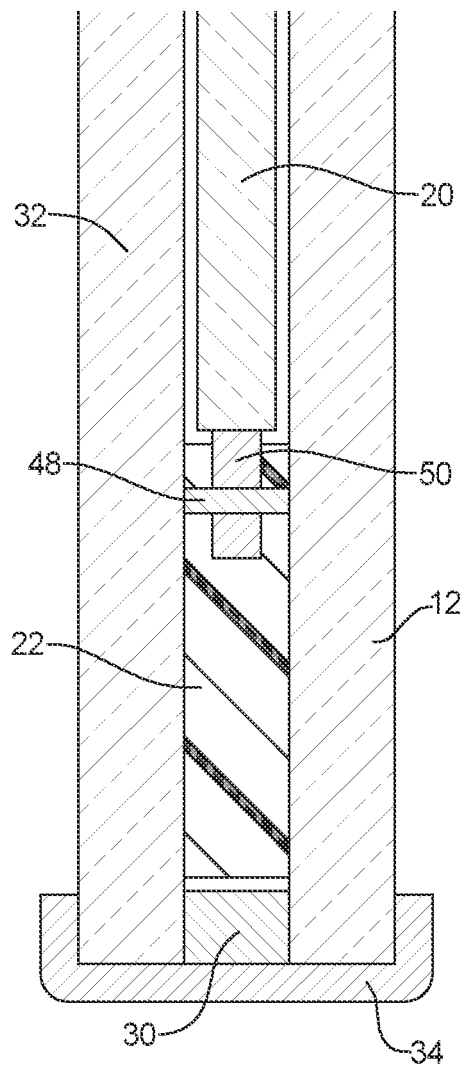
FIG. 2 is a c cross-sectional view taken along line 2-2 of FIG. 1 illustrating the privacy glass vision panel assembly according to the principles of the present disclosure.

With reference to FIGS. 1-4, a privacy glass vision panel assembly 10 is shown including a front fixed glass panel 12 with evenly spaced vertical non-transparent lines 14 alternating with transparent lines 16. The front fixed glass panel 12 can include a non-transparent border 18 extending around a printer thereof. With particular reference to FIG. 2, a middle movable glass panel 20 is movably supported by a plurality of bearing tracks 22 (one of which is shown in FIG. 2). The middle movable glass panel 20 further includes evenly spaced vertical non-transparent lines 24 alternating with vertical transparent lines 26. The vertical non-transparent lines 24 of the middle movable glass panel 20 can be aligned with the alternating vertical non-transparent lines 14 of the front fixed glass panel 12 to allow vision through the panel assembly. Alternatively, the middle movable glass panel 20 can be moved relative to the front fixed glass panel 12 so that the vertical non-transparent lines 24 cover the transparent lines 16 of the front fixed glass panel 12 in order to inhibit vision through the privacy glass vision panel assembly 10.

With continued reference to FIG. 2, a spacer bar 30 is adhered to the front fixed glass panel 12 around a perimeter thereof and a rear fixed glass panel 32 is sandwiched on an opposite side of the middle movable glass panel 20 from the front fixed glass panel 12. A frame structure 34 is provided for sealingly securing the privacy glass vision panel assembly 10 together. Additional sealants and or gaskets can be utilized for providing a sealed connection for the privacy glass vision panel assembly 10.

Figure 3:
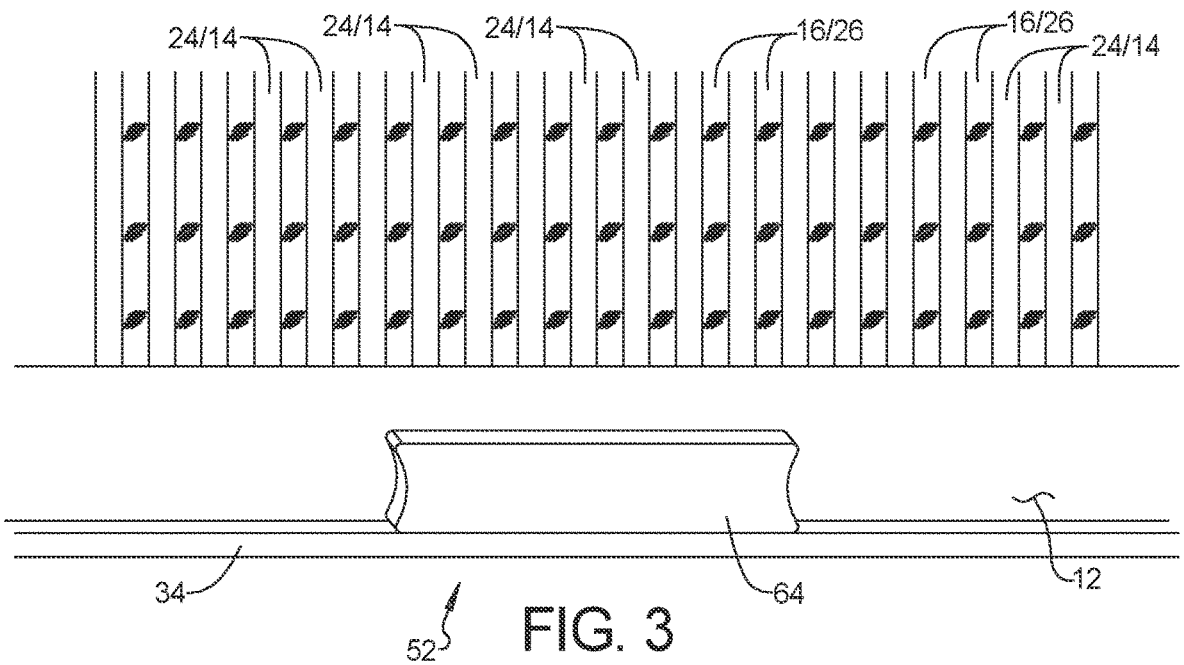
FIG. 3 is a detailed perspective view illustrating a portion of the privacy glass vision panel assembly in an open condition.
Figure 4:
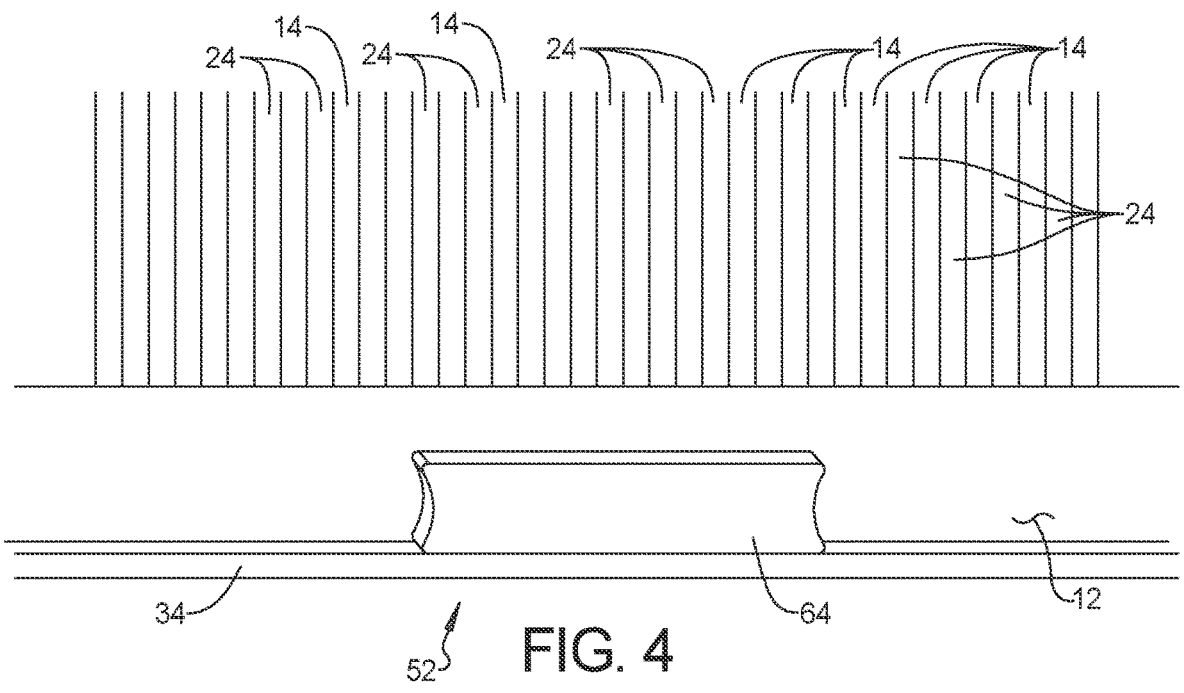
FIG. 4 is a detailed perspective view illustrating a portion of the privacy glass vision panel assembly in a closed condition.

With particular reference to FIG. 3, a portion of the privacy glass vision panel assembly 10 is shown in an open condition wherein the vertical non-transparent lines 24 of the middle movable glass panel 20 are aligned with the alternating vertical non-transparent lines 14 of the front fixed glass panel 12 to allow vision through the aligned transparent lines 16/26 of the panel assembly 10. With reference to FIG. 4, the same portion of the privacy glass vision panel assembly 10 is shown in a closed condition wherein the vertical non-transparent lines 24 of the middle movable glass panel 20 are aligned with the alternating transparent lines 16 of the front fixed glass panel 12 to inhibit vision through the panel assembly 10.

The width of the non-transparent lines 14/24 and the transparent lines 16/26 can be selected based upon a desired visibility. According to a preferred embodiment, the width of the non-transparent lines 14/24 and the transparent lines 16/26 can be between $5/32$ of an inch and 2 inches and more preferably less than 1 inch. The present disclosure refers to fixed front glass panel 12, rear fixed glass panel 32 and middle movable glass panel 20. However, it should be understood that the term "glass" is intended to refer to any alternative transparent panel such as, but not limited to, polycarbonate. In addition, the glass panels can be tempered, bullet proof, or otherwise treated or any other type of glass. In addition, the non-transparent lines 14/24 and border 18 can be formed by a vinyl overlay, by sandblasting, by digital print or by other known techniques. Furthermore, the rear fixed glass panel 32 can be provided with a border 18 similar to the front fixed glass panel 12 and can optionally include the non-transparent lines 14, although they are not necessary.

Figure 5:
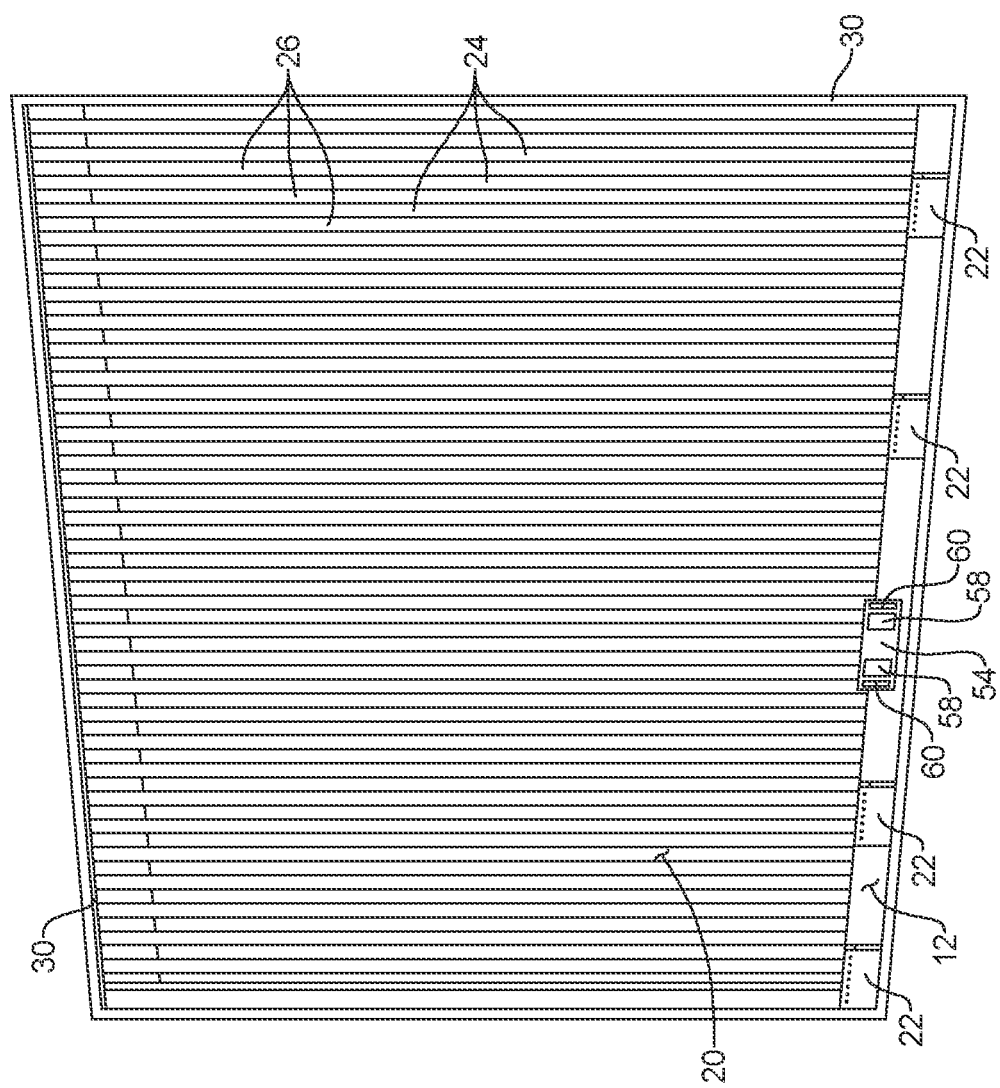
FIG. 5 is a perspective view of a portion of the privacy glass vision panel assembly according to the principles of the present disclosure.
Figure 7:
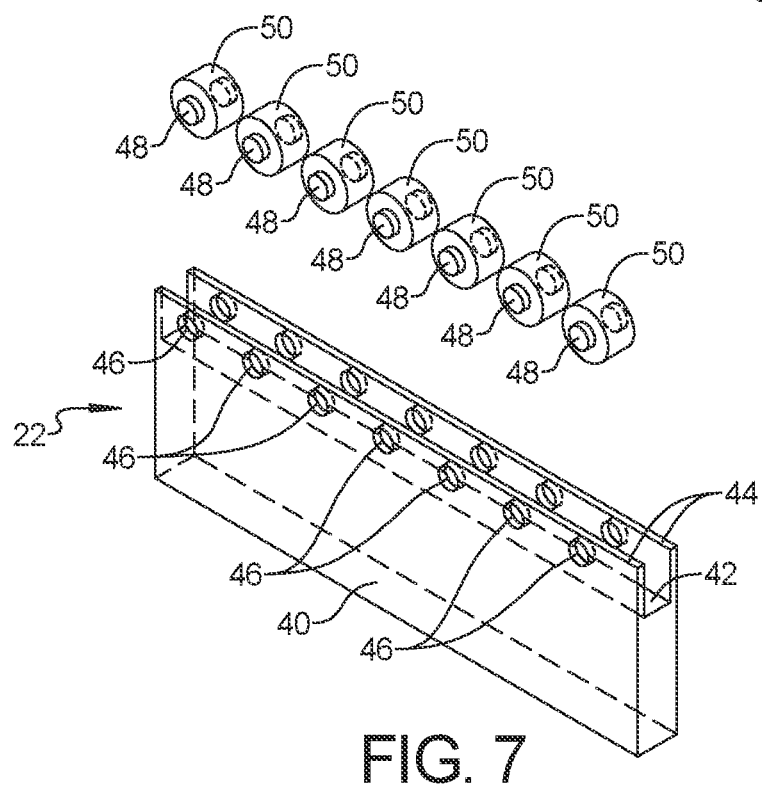
FIG. 7 is an exploded perspective view of a bearing track of the privacy glass vision panel assembly according to the principles of the present disclosure.

With reference to FIG. 5, a rear perspective view of the privacy glass vision panel assembly 10 is shown with the rear fixed glass panel 32 removed in order to illustrate the interior components. In particular, FIG. 5 illustrates the spacer bar 30 adhered to a perimeter of the back surface of the front fixed glass panel 12. A plurality of bearing tracks 22 are adhered and spaced along a bottom edge of the front fixed glass panel 12. A bottom edge of the middle movable glass panel 20 is disposed against the plurality of bearing tracks 22. With reference to FIG. 7, a bearing track assembly 22 is shown including an elongated body 40 having a groove 42 therein. A pair of flanges 44 are disposed on opposite sides of the groove 42 and include a plurality of apertures 46 for receiving respective spindles 48 of each individual roller bearing 50. In the embodiment shown, each bearing track assembly 22 includes seven roller bearings 50. However, more or fewer roller bearing 50 can be used based upon the size and weight of the middle movable glass panel 20. In addition, as shown in FIG. 5, four bearing track assemblies 22 are shown, although more or fewer bearing track assemblies 22 can be used depending upon the size and weight of the middle movable glass panel 20.

Figure 6:
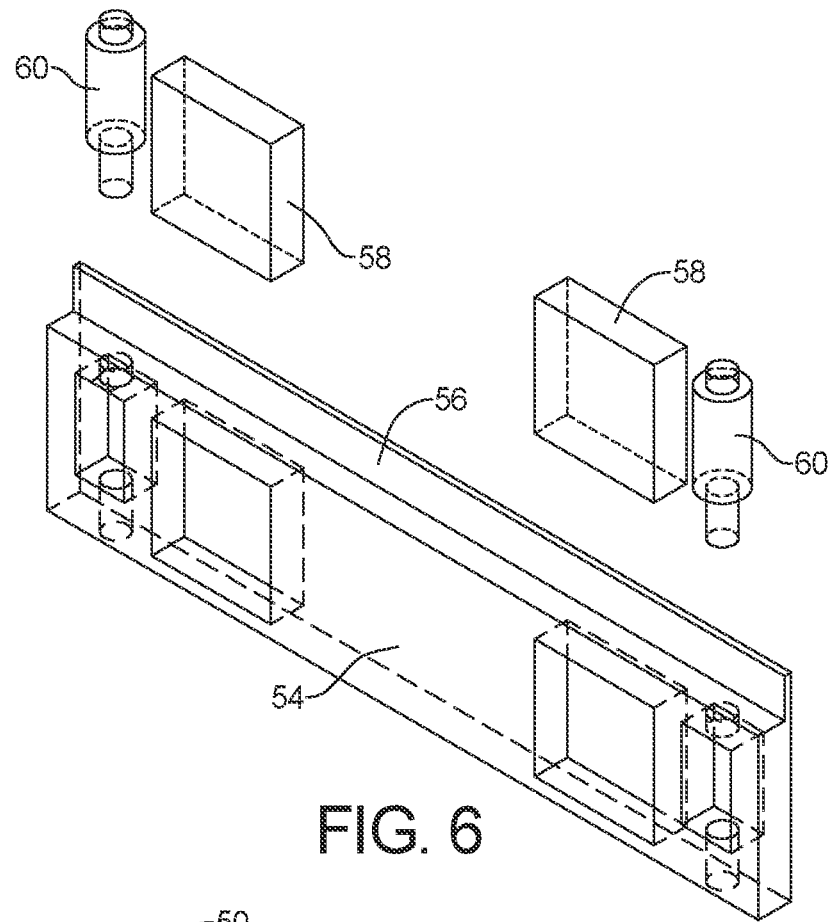
FIG. 6 is an exploded perspective view of the inner components of the magnetic operating mechanism of the privacy glass vision panel assembly according to the principles of the present disclosure.

As shown in FIGS. 3 and 4, a magnetic mechanism 52 can be utilized for moving the middle movable glass panel 20 relative to the fixed front glass panel 12 and the fixed rear glass panel 32. As shown in FIG. 6, the magnetic mechanism 52 can include an inner bracket 54 that includes an upper flange 56 that is secured to the middle movable glass panel 20 by an adhesive or by other known connection methods. The inner bracket 54 can support a pair of magnets 58 arranged with their polarity pointing in a common direction. The inner bracket can further include a pair of rollers 60 that aid in guiding the movement of the middle movable glass panel between the front fixed glass panel 12 and the rear fixed glass panel 32.

Figure 8:
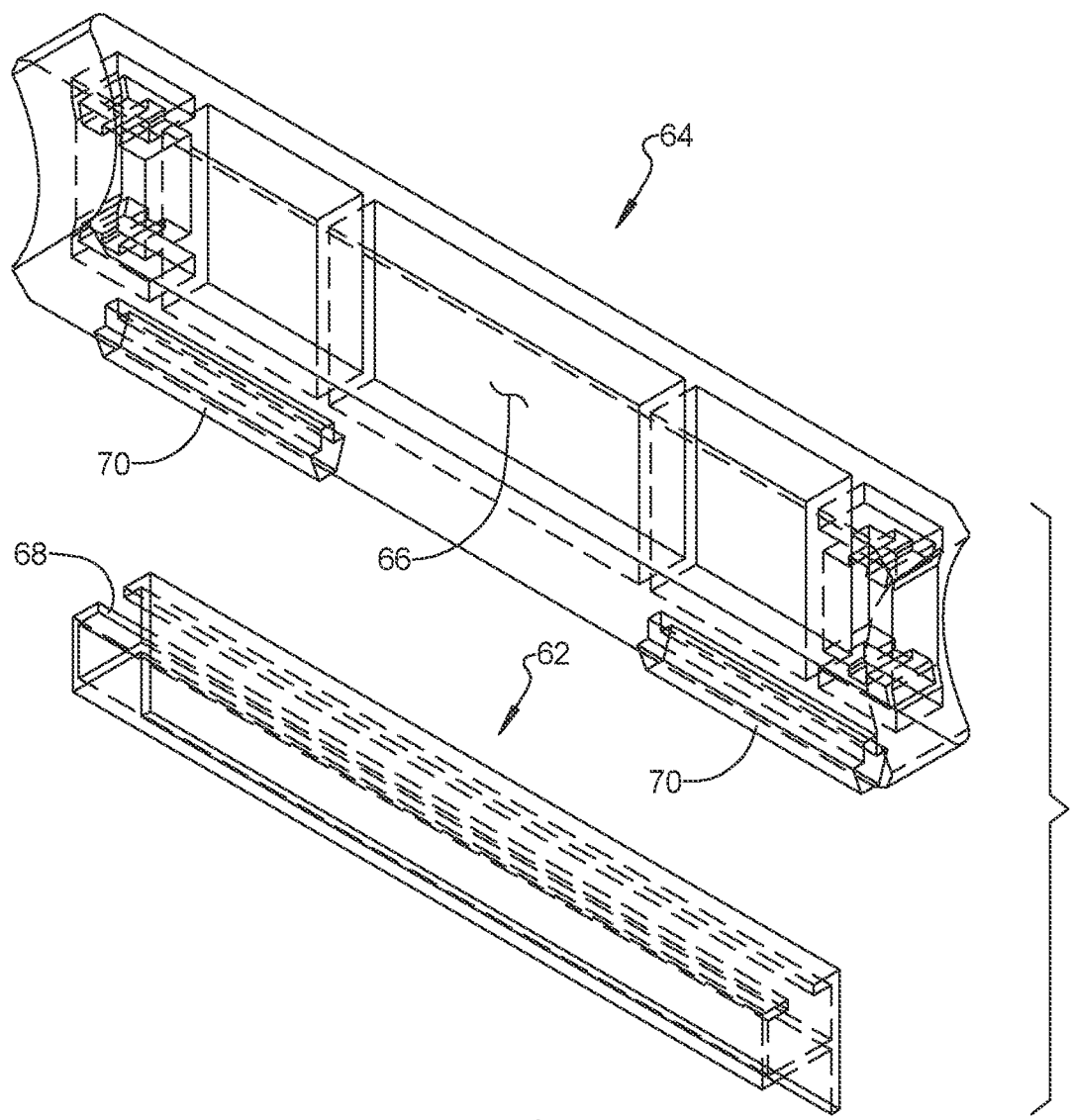
FIG. 8 is an exploded perspective view of the outer components of the magnetic operating mechanism of the privacy glass vision panel assembly according to the principles of the present disclosure.

With reference to FIGS. 3 and 8, the magnetic mechanism 52 further includes an outer unit including a base 62 that is fixed to the front fixed glass panel 12. A slide 64 is mounted to the base 62 and supports a magnet 66 between the pair of magnets 58 supported by the inner bracket 54. The magnet 66 has a polarity arranged opposite to the pair of magnets 58 supported by the inner bracket 54. The base 62 includes a guide slot 68 that is engaged by a pair of slide rails 70 that are slidable along the guide slot 68. As the slide 64 is moved in a lateral direction along the guide slot 68 of the base 62, the magnetic field of the magnet 66 interacts with the magnetic fields of the pair of magnets 58 to repel one another to cause the middle movable glass panel 20 to move in either lateral direction in response to movement of the slide 64. It should be understood that the base 62 and slide 64 can take on alternative forms. In addition, the slide could alternatively be used to support multiple magnets that interact with the magnetic field of the magnets 58 of the inner bracket 54.

The design of the present disclosure provides a privacy glass vision panel assembly 10 with an easily operable device for opening and closing the visibility through the panel 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A privacy glass vision panel assembly, comprising;
    a fixed first transparent panel having a plurality of spaced vertical non-transparent lines disposed between spaced vertical transparent lines;
    a movable second transparent panel having a plurality of spaced vertical non-transparent lines disposed between spaced vertical transparent lines;
    a bearing system supporting the movable second transparent panel relative to the fixed first transparent panel;
    a first magnet unit secured to the movable second vision panel; and
    a second magnet unit secured to and movable relative to the fixed first transparent panel in proximity to the first magnet unit to cause movement of the movable second transparent panel when the second magnet unit is moved relative to the fixed first transparent panel.

2. The privacy vision panel assembly according to claim 1, further comprising a fixed third transparent panel secured to the fixed first transparent panel and including a spacer bar secured between the fixed first transparent panel and the fixed third transparent panel.

3. The privacy vision panel assembly according to claim 2, wherein the fixed first transparent panel and the fixed third transparent panel each include a non-transparent border region extending around a perimeter thereof.

4. The privacy vision panel assembly according to claim 1, wherein the bearing system includes a bearing track supporting a plurality of roller bearings engaging the movable second transparent panel.

5. The privacy vision panel assembly according to claim 4, wherein the bearing track includes a pair of spaced sidewalls with a plurality of opposing apertures supporting a spindle of the plurality of roller bearings.

6. The privacy vision panel assembly according to claim 1, wherein the second magnet unit is secured to a slide member slidably secured to the fixed first transparent panel.

7. The privacy vision panel assembly according to claim 6, wherein the slide member is slidably mounted to a base member mounted to the fixed first transparent panel.

8. The privacy vision panel assembly according to claim 7, wherein the slide member encases the base member and is movable in a lateral direction.

9. The privacy vision panel assembly according to claim 1, wherein the plurality of spaced vertical non-transparent lines and the plurality of spaced vertical transparent lines of the fixed first transparent panel and the movable second transparent panel are less than 1 inch wide.

10. The privacy vision panel assembly according to claim 1, wherein the first magnet unit includes a frame adhered to the movable second transparent panel, wherein the frame supports at least one magnet.

11. The privacy vision panel assembly according to claim 10, wherein the frame further supports a roller bearing for engaging at least one of the fixed first transparent panel and the fixed third transparent panel.

12. The privacy vision panel assembly according to claim 1, wherein the fixed first transparent panel and the movable second transparent panel are made from one of glass and polycarbonate.

13. The privacy vision panel assembly according to claim 1, wherein the plurality of spaced vertical non-transparent lines on the fixed first transparent panel and the movable second transparent panel are formed from one of sand blasting and a vinyl overlay.

14. The privacy vision panel assembly according to claim 1, further comprising a pair of stop blocks secured to one of the fixed first transparent panel and the fixed third transparent panel on opposite sides of the first magnet unit.

15. The privacy vision panel assembly according to claim 1, wherein the first magnet unit includes a pair of magnets supported by a frame in a spaced apart arrangement with a common polarity and the second magnet unit includes a single magnet disposed between the pair of magnets of the first magnet unit and having a polarity arranged opposite to the polarity of the pair of magnets of the first magnet unit.

\* \* \* \* \*